United States Patent
Hall et al.

(10) Patent No.: US 11,167,549 B2
(45) Date of Patent: Nov. 9, 2021

(54) SYSTEMS AND METHODS FOR PRINTER DENSITY COMPENSATION AND STABILITY

(71) Applicant: Global Graphics Software Limited, Cambridge (GB)

(72) Inventors: Daniel Hall, Cambridge (GB); James Fox, Herts (GB)

(73) Assignee: GLOBAL GRAPHICS SOFTWARE LIMITED, Cambridge (GB)

(*) Notice: Subject to any disclaimer, the term of this patent is extended or adjusted under 35 U.S.C. 154(b) by 16 days.

(21) Appl. No.: 16/813,054

(22) Filed: Mar. 9, 2020

(65) Prior Publication Data

US 2021/0276322 A1     Sep. 9, 2021

(51) Int. Cl.
*B41J 2/045*     (2006.01)

(52) U.S. Cl.
CPC ....... *B41J 2/04508* (2013.01); *B41J 2/04586* (2013.01)

(58) Field of Classification Search
CPC ...... B41J 2/04508; B41J 2/04586; B41J 2/36; B41J 2/362; B41J 29/393; B41J 2029/3935
See application file for complete search history.

(56) References Cited

U.S. PATENT DOCUMENTS

2019/0126609 A1* 5/2019 Mizutani .............. B41J 2/04536

* cited by examiner

*Primary Examiner* — Thinh H Nguyen
(74) *Attorney, Agent, or Firm* — Branch Partners PLLC; Bruce E. Black (57) ABSTRACT

A method for adjusting a modifiable printing parameter of each of a plurality of printing elements of a printing device includes printing a plurality of test charts for each of the printing elements at different values of the modifiable printing parameter; measuring a variance of a printing density for each of the test charts; analyzing the measured variances for each of the printing elements; individually selecting a value of the modifiable printing parameter for each of the printing elements based on the analysis; and applying the selected value of the modifiable printing parameter for each of the printing elements to the printing device. Software density compensation can be applied to further reduce the variance of the printing density.

20 Claims, 3 Drawing Sheets

SYSTEMS AND METHODS FOR PRINTER DENSITY COMPENSATION AND STABILITY

FIELD

The invention relates to systems and method for providing printer density compensation. The invention also relates to systems and methods for providing printer density compensation with printing stability.

BACKGROUND

Digital printing systems, such as inkjet presses and printers, can have or develop quality and stability issues. Directional printing artifacts like streaks and banding are commonly encountered problems in digital printing systems. For example, inkjet systems may produce characteristic density variations due to inconsistencies between printheads or intra-printhead variations between nozzles. These issues may be further exacerbated by tuning physical parameters to compensate for printing component density variation. For example, industrial inkjet printers using multiple printheads per color channel may be subject to driver voltage adjustments to normalize the average printing density between printheads. However, it has been shown that changing driver voltages can have a negative impact on the intra-printhead density variation and jetting stability over time. Also using driver voltages which cause high intra-printhead variability may be associated with shorter printhead lifetimes.

BRIEF SUMMARY

One embodiment is a method for adjusting a modifiable printing parameter of each of a plurality of printing elements of a printing device. The method includes printing a plurality of test charts for each of the printing elements at different values of the modifiable printing parameter; measuring a variance of a printing density for each of the test charts; analyzing the measured variances for each of the printing elements; individually selecting a value of the modifiable printing parameter for each of the printing elements based on the analysis; and applying the selected value of the modifiable printing parameter for each of the printing elements to the printing device.

Another embodiment is a system for adjusting a modifiable printing parameter of each of a plurality of printing elements of a printing device. The system includes one or more memory devices that store instructions; a parameter adjustment engine stored in the one or more memory devices, the parameter adjustment engine configured to; and one or more processor devices that execute the stored instructions to perform actions for operation of the parameter adjustment engine, the actions including: measuring a variance of a printing density for a plurality of test charts printed for each of the printing elements at different values of the modifiable printing parameter; analyzing the measured variances for each of the printing elements; individually selecting a value of the modifiable printing parameter for each of the printing elements based on the analysis; and applying the selected value of the modifiable printing parameter for each of the printing elements to the printing device. In at least some embodiments, the actions further include printing the plurality of test charts.

Yet another embodiment is a non-transitory computer-readable medium having stored thereon instructions for execution by a processor, the instructions including: measuring a variance of a printing density for a plurality of test charts printed for each of the printing elements at different values of the modifiable printing parameter; analyzing the measured variances for each of the printing elements; individually selecting a value of the modifiable printing parameter for each of the printing elements based on the analysis; and applying the selected value of the modifiable printing parameter for each of the printing elements to the printing device. In at least some embodiments, the instructions further include printing the plurality of test charts.

In at least some embodiments, the method, actions, or instructions further comprise applying software density compensation to further reduce the variance of the printing density.

In at least some embodiments, printing the plurality of test charts includes printing the test charts for a plurality of colors for each of the printing elements. In at least some embodiments, printing the plurality of test charts includes printing the test charts for a plurality of different input density levels for each of the printing elements. In at least some embodiments, printing the plurality of test charts includes printing the test charts at a plurality of different times, separated by at least 15 minutes, for each of the printing elements.

In at least some embodiments, the analyzing includes weighting the measured variance by the input density value associated with that measured variance. In at least some embodiments, the analyzing includes weighting the measured variance by a time at which the associated test chart was printed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The invention relates to systems and method for providing printer density compensation. The invention also relates to systems and methods for providing printer density compensation with printing stability.

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment, or an embodiment combining software and hardware aspects. The following detailed description is, therefore, not to be taken in a limiting sense. The methods described herein can be performed using any type of processor and any suitable type of device that includes a processor.

Figure 1A:
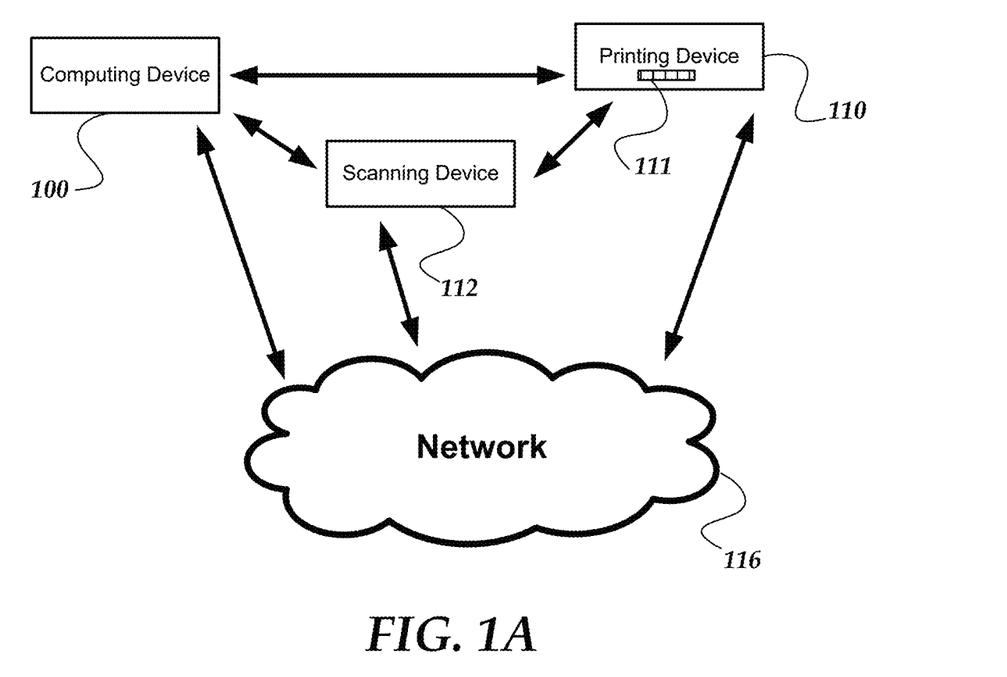
FIG. 1A is a schematic representation of one embodiment of an environment in which the invention can be employed.

FIG. 1A illustrates one embodiment of an environment for the systems and methods described herein. The environment includes a printing device 110, a computing device 100, and a scanning device 112. It will be understood that two or more of these devices may be combined in a single physical device. For example, the computing device 100 and printing device 110 may be a printer and associated computer hardware/software and, in some embodiments, may also include the scanning device 112. It will also be understood that any of the devices may be actually multiple devices, such as multiple computing devices 100 or multiple printing devices 110.

In at least some embodiments, the environment also includes a network 216 that can be a local area network, a wide area network, the Internet, or any combination thereof. It will also be understood that the network can include devices, other than those illustrated, coupled to the network and that there may be multiple devices of each type illustrated connected to the network. The computing device 100, printing device 110, and scanning device 112 can be directly coupled to each other and can be coupled through the network 216 or through one or more other devices (e.g., computers, workstations, servers, or the like).

The printing device 110 can be a printing press, printer, or the like and can be an inkjet printing device, thermal printing device, or any other suitable printing device. The printing device 110 includes one or more printing elements 111 that print onto a medium provided to the printing device. For example, the printing elements 111 can be inkjet printheads, printer nozzles, thermal printheads, or the like.

The computing device 100 can be a computer, tablet, workstation, server, mobile device, or any other suitable device that can process instructions. The scanning device 112 can be an optical scanner, camera system, spectrophotometric system, quality control system, photodiode, photodiode array, or any other suitable device or system that can scan or analyze test charts or other printing samples. The scanning device 112 can be, for example, off-line, in-line, near-line, or otherwise positioned relative to the printing device 110. In at least some embodiments, the scanning device 112 may be part of the printing device 110 as the printing device monitors its own operation or may be a device or software that is coupled to, or part of, the printing device to monitor the operation of the printing device.

Figure 1B:
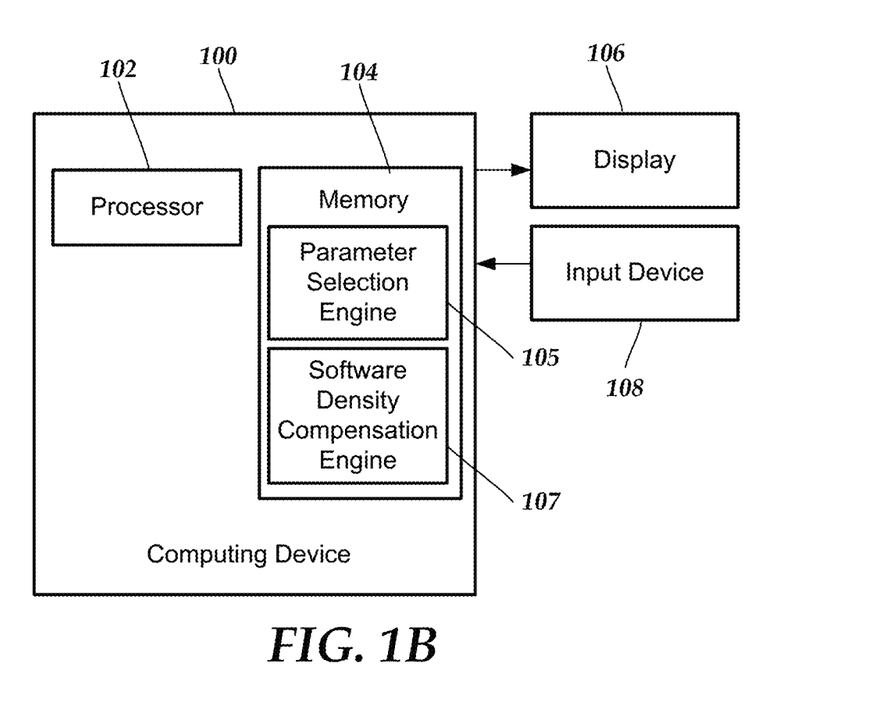
FIG. 1B is a schematic representation of one embodiment of a computing or printing device.

FIG. 1B illustrates one embodiment of a computing device 100 which can be used for analyzing test charts or other print output for print density compensation or other purposes In at least some embodiments, the computing device 100 can be a printing device or part of a printing device or coupled wirelessly, through a local or non-local network, or by wire to a printing device. The computing device 100 includes a processor 102 and a memory 104 and can be attached to one or more of an optional display 106 or an optional input device 108.

The computing device 100 can be, for example, a laptop computer, desktop computer, printing press, printer, tablet, mobile device, smartphone or any other device that can run applications or programs, or any other suitable device for processing information. The computing device 100 can be entirely local to the user or can include components that are non-local to the user including one or both of the processor 102 or memory 104 (or portions thereof). For example, in some embodiments, the user may operate a terminal that is connected to a non-local computer. In some embodiments, the memory can be non-local to the user.

The computing device 100 can utilize any suitable processor 102 including one or more hardware processors that may be local to the user or non-local to the user or other components of the computing device. The processor 102 is configured to execute instructions provided to the processor.

Any suitable memory 104 can be used for the computing device 100. The memory 104 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computing device.

Communication methods provide another type of computer readable media; namely communication media. Communication media typically embodies computer-readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

The memory 104 includes instructions that can be executed in the processor 102. The memory may also include instructions that constitute a variety of different software engines. For example, the memory 104 can include a parameter selection engine 105, which is described in more detail below, or a software density compensation engine 107 (for example, PrintFlat™ (available from Global Graphics Software, Cambridge, UK)) or any combination thereof. In at least some embodiments, this engine may be referred to as a module or logic.

The display 106 can be any suitable display device, such as a monitor, screen, display, or the like. The input device 108 can be, for example, a keyboard, mouse, touch screen, track ball, joystick, voice recognition system, or any combination thereof, or the like and can be used by the user to interact with a user interface.

Directional printing artifacts like streaks and banding are commonly encountered problems in digital printing systems. For example, inkjet systems may produce characteristic density variations due to inconsistencies between printheads or intra-printhead variations between nozzles. These directional variations have conventionally been addressed by tuning of physical parameters such as drive voltages or thermal profiles to produce a fairly uniform density across the press. However, limitations with this approach include the granularity of control: different drop sizes, for example, may not respond the same to changing physical parameters, so density variations may not vary consistently between light and dark areas.

Aa an example, current conventional industry practice for printer density compensation is to trim the driver voltages for the printing elements in the system to normalize the average printing density of each printing element for which such modulation exists. In at least some instances, this process is referred to as "Voltage Trimming". Printer density compensation can also be achieved by software applied to the digital image data before it is printed. One example of software density compensation is available using Print-Flat™ (available from Global Graphics Software, Cambridge, UK).

In contrast, as described herein, methods and systems for printer density compensation can select the drive voltage for individual printing elements (e.g., printheads or inkjet printer nozzles) to reduce or minimize intra-printhead variation. In at least some embodiments, these methods and systems can be used in combination with software density compensation for addressing printer density variations across the printing elements of the printing system.

Manufacturers of printing elements (e.g., printheads or inkjet printer nozzles) often provide data on what driver voltages are recommended, sometimes on an element by element basis. However, it is known that the optimal driver voltage may be influenced by a variety of factors including one or more of the following: the specific fluids (for example, inks) jetted or printed; environmental conditions (for example, temperature and humidity) at the printer or press site; or age of the printing element. Therefore, voltage adjustment (trimming) can often be a necessary or useful process to repeat in order to enhance printing system quality when the printing elements are in situ on a given press and ink configuration. However, the specific voltages chosen can affect various process parameters, not just the printing density. Examples of such parameters can include press stability or printing element lifetime.

In at least some embodiments, the methods and systems described herein can provide a more stable printing device or system or longer printing element lifetimes or any combination thereof. Thus, such methods and systems may improve both the quality and economic efficiency of digital printing systems.

In at least some embodiments, intra-printing element variability at different printing densities may be correlated with printing instabilities. Examples of printing instabilities include, but are not limited to, the incidence of missing or deflected nozzles for inkjet systems or other general density instabilities over time. Measurements of intra-printing element variations (for example, the standard deviation of variances in densities between nozzles of each voltage adjustable printing element individually) can be used to determine an individual driver voltage for each printing element that promotes printing stability over time. In at least some embodiments, the measurement of intra-printing element variations can also be used in conjunction with software density compensation to further reduce print variability. In at least some embodiments, the density compensation obtained from measurements of intra-printing element variation can be more stable over time, produce better print quality, or operate for a longer time without a re-calibration or any combination of these features.

The methods and systems, as described herein, can be used to reduce print variability and, at least in some embodiments, maintain or enhance printer stability. The methods and systems are described with respect to inkjet printing devices; but can be used for other printing devices, such as thermal printing devices. In addition, the description uses driver voltage as an example of a modifiable parameter, but any other suitable printing parameter applicable to individual printing elements can be used.

Figure 2:
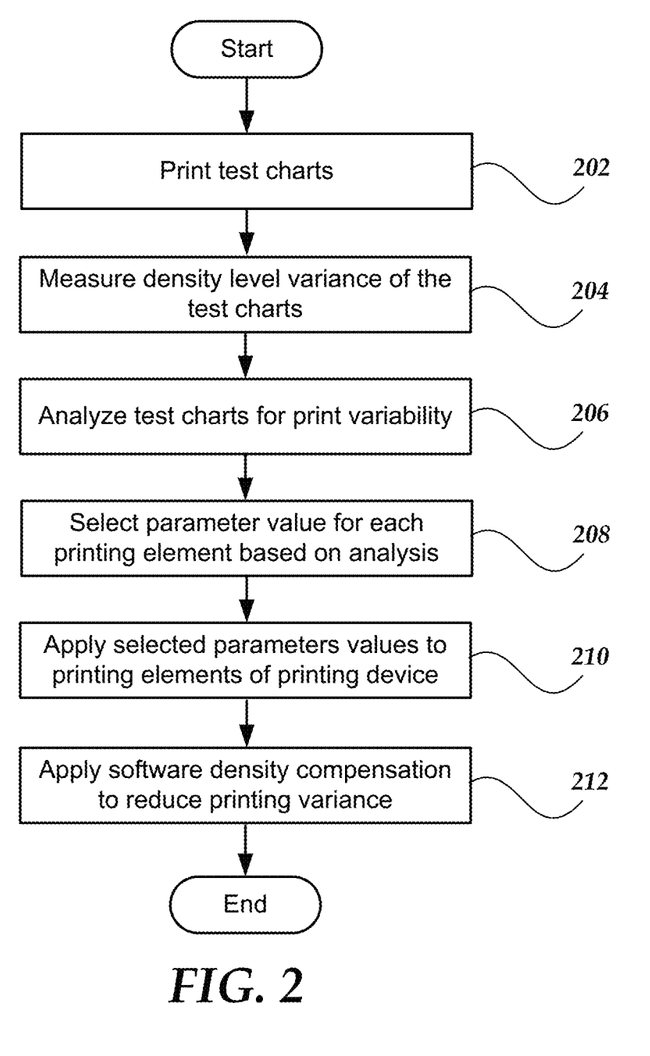
FIG. 2 is flowchart of one embodiment of a method of determining a value for a modifiable print parameter for each printing element, according to the invention.

FIG. 2 is a flowchart of one embodiment of a method for individually determining a modifiable printing parameter (for example, a driver voltage) for multiple printing elements. The method can be performed by a user or by using, for example, the parameter selection engine 105 of FIG. 1 or by any combination of manual and automated steps.

In step 202, test charts are printed for one or more of the printing elements (for example, for all of the printing elements) of a printing device and for multiple values of a modifiable printing parameter (for example, the driver voltage). A single print output can include a single test chart or multiple test charts for different printing parameters or different printing elements or any combination thereof.

In at least some embodiments, at least one test chart is printed for at least one color channel. In at least some embodiments, at least one test chart is printed for each color channel or for each of multiple color channels.

In at least some embodiments, test charts can be printed for multiple input density levels. In at least some embodiments, the test charts include printed output for most or all of the input density levels as the intra-printing element variation can often depend on the input density level. This can be due to various underlying physical phenomena. As an example, a faster firing nozzle may dissipate more heat which can affect the local environment including neighboring nozzles. As another example, the rheology of the ink may be such that occasional firing of an inkjet nozzle will affect the print nozzle meniscus differently and therefore tend to trigger or inhibit secondary effects such as nozzle blocking or nozzle deflection which can affect the intra-printing element density variance.

In at least some embodiments, a series of test charts can be printed at different times (for example, periodically, such as one per day, one per hour, one per quarter hour, or the like; or aperiodically; or at random times; or at user-initiated times; or any combination thereof) for each of the one or more printing elements and each of the values of the modifiable printing parameter. The series of test charts printed at different times may better represent actual average operation of the printing element.

As an example, a test chart can be printed every hour of operation over two or three days for each printing element (e.g., each printhead) at several driver voltages (for example, at steps of 3V from a factory standard voltage—for example, if the factory standard voltage is 20V, then steps such as 14V, 17V, 20V, 23V, and 26V can be used).

In step 204, for each printing element and for each input density level or modifiable parameter value, the valiance (for example, the standard deviation) of that density level or modifiable parameter value across the modifiable printing elements (e.g. inkjet printhead voltage driver banks across the printbar) is measured or otherwise determined using the printed test charts. In at least some embodiments, the test charts can be scanned using a scanning device 112 (FIG. 1A) such as a suitable image scanner or photo-densitometer. The scanned test charts can then be used to determine the variance in density level for each printing element and modifiable parameter value and may also include consideration of one or more of color; input density level; time; or the like.

In step 206, the results of the scanning can be analyzed by any suitable arrangement including; but not limited to, a computer system with analysis software. For instances in which there are multiple test charts for a particular printing element, the analysis may include an algorithm for selection of a value of the modifiable parameter based on averaging or otherwise combining or analyzing the results from the multiple test charts. In at least some embodiments, the results are analyzed to determine for each modifiable printing element a modifiable parameter value (e.g. driver voltage) which provides the lowest (or at least a reduced) intra-modifiable printing element variation across all input densities.

In at least some embodiments, the scanning results may be beneficially weighted by input image density to determine a modifiable parameter value (for example, driver voltage) that is unbiased by optical density or perceptual response or both. In at least some embodiments, the weightings may be modifiable by the end user, for example, in the context of particular printing application domains. As an example, for printing applications which are most sensitive to dark colors, in at least some embodiments, the user can adjust the weightings to positively bias the effects of higher density intra-printhead variability over lighter lower printing densities.

In at least some embodiments, the scanning results may be beneficially weighted with respect to sample time, for example, to amplify the significance of density changes over time over spatial density variations that are consistent over time. In at least some embodiments, such weighting may be modifiable by the end user. For example, a user who desires printing stability over long runs of continuous printing of the same image (e.g. packaging) may reduce any variation that occurs over a run once a print job quality has been approved as accepted. Such a user might therefore bias results in favor of reducing intra-printing element variability over time.

In at least some embodiments, the analysis may also interpolate values to determine the modifiable parameter value. For example, the analysis may utilize interpolation to determine a driver voltage that is between driver voltages used in generating the test charts.

In step 208, the modifiable parameter values (e.g. inkjet printhead driver voltage) of the individual printing elements are selected based on the analysis to reduce intra-printing element variation and time stability. In at least some embodiments, this selection can be made without regard to the average density produced by each printing element.

In step 210, the selected modifiable parameter values of the individual printing elements are set on the printing device. In at least some embodiments, the printing device should now demonstrate printing element to printing element density variations that remain relatively stable within the range of the modifiable driver parameters over time.

In at least some embodiments, in step 212, software density composition (such as PrintFlat™ (available from Global Graphics Software, Cambridge, UK)) is applied to reduce printing variance.

In at least some embodiments, these steps can be performed repeatedly on a scheduled, regular, irregular, random, or user-initiated basis, or any combination thereof. In at least some embodiments, software density compensation may also be applied to further adjust or normalize the printing density across the printing elements.

These methods may be applied beneficially to printing devices other than inkjet printers and modifiable parameters other than driver voltage. For example some non-inkjet digital printing devices employ arrays of heaters to modify the thermal profile of the printing system to adjust for printing density. In this case these methods can be used to modify the thermal gradient to reduce intra modifiable printing element variation and, at least in some embodiments, can be further used in conjunction with software density compensation to provide more uniform printing density quality and printing stability over time.

The methods and systems described herein can have one or more of the following advantages as compared to conventional density compensation techniques such as conventional "voltage trimming": better stability over time; less wastage; better print quality; less density variation; fewer calibration cycles required and saving of time; longer print runs; better printer utilization efficiency; longer printing element lifetimes to save on time, wastage and hardware replacement cost; or the potential to extend the useful variety of print jobs, substrates, or inks that the system can support allowing for wider printing system scope of application.

As an example of the systems and methods described herein, two side-by-side high quality industrial inkjet printheads were tested. Both printheads were driven using the same ink supply system. One printhead was new and the other printhead had been used for more than six months. A test print pattern was selected to minimize any secondary effects from substrate wetting or curing (i.e. each drop was placed in a separate 5×5 pixel space). The selected pattern also ensured that each nozzle of the printhead was exercised uniformly. Ten different driver voltages, in the range from 17V to 26V, were tested. Both printheads simultaneously printed onto sheets of A4 coated stock paper. Two sheets of test charts were printed for each voltage. Each print was scanned by a flatbed scanner.

The data in the following tables was determined from the printed test charts. The Relative Density is given as +/− percentage relative to the average density of both printheads. The Relative Variance is the +/− percentage relative to the average variance of both printheads. Each result shown was averaged from two separate print measurements. Printhead 1 and Printhead 2 printed simultaneously onto the same substrate for each print.

| Drive Voltage | Relative Density | Relative Variance |
|---|---|---|
| Printhead 1 | | |
| 17.0 | −8.6% | 13.1% |
| 18.0 | −6.9% | 8.2% |
| 19.0 | −5.1% | −0.4% |
| 20.0 | −2.5% | −10.5% |
| 21.0 | −1.1% | −5.6% |
| 22.0 | 0.2% | −1.3% |
| 23.0 | 1.0% | 6.1% |
| 24.0 | 2.2% | 10.8% |
| 25.0 | 6.9% | 16.9% |
| 26.0 | 11.8% | 19.8% |
| Printhead 2 | | |
| 17.0 | −9.0% | −26.7% |
| 18.0 | −7.2% | −20.4% |
| 19.0 | −6.3% | −19.9% |
| 20.0 | −4.6% | −14.2% |
| 21.0 | −2.3% | −8.0% |
| 22.0 | −0.7% | −5.8% |
| 23.0 | −0.5% | −4.4% |
| 24.0 | 5.4% | 15.4% |
| 25.0 | 11.4% | 12.4% |
| 26.0 | 16.1% | 14.8% |

Figure 3:
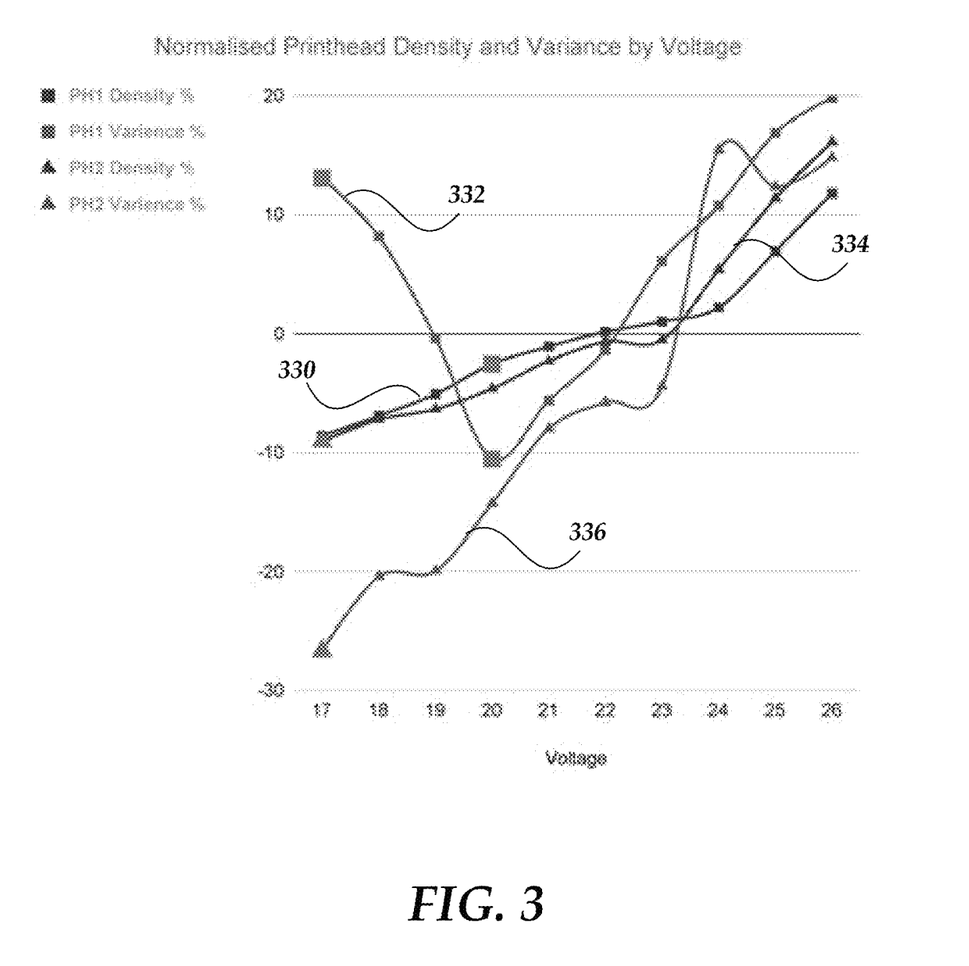
FIG. 3 is a graph of density percentage or variance percentage versus driver voltage for two different printheads, according to the invention.

These results are graphed in FIG. 3. Line 330 corresponds to Printhead 1 relative density percentage, line 332 corresponds to Printhead 1 relative variance percentage, line 334 corresponds to Printhead 2 relative density percentage 334, and line 336 corresponds to Printhead 2 relative variance percentage.

In this example, the new Printhead 2 generally had lower variance as would be generally expected. The relative density for both printheads increased generally monotonically with drive voltage. There is a variance minimum for the older Printhead 1 at about 20 V. There is a relatively steep relationship between drive voltage and variance for the new printhead. The variance minimum for the new Printhead 2 is about 17.0 V. The drive voltages for the two printheads can be selected as the variance minimums as determined from the test charts.

It will be understood that each block of the flowchart illustration, and combinations of blocks in the flowchart illustration and methods disclosed herein, can be implemented by computer program instructions. These program instructions may be provided to a processor to produce a machine or engine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computing device. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computing device.

The above specification and examples provide a description of the invention. Since many embodiments of the invention can be made without departing from the spirit and scope of the invention, the invention also resides in the claims hereinafter appended.

What is claimed as new and desired to be protected by Letters Patent of the United States is:

1. A method for adjusting a modifiable printing parameter of each of a plurality of printing elements of a printing device, the method comprising:
    printing a plurality of test charts for each of the printing elements at different values of the modifiable printing parameter;
    for each of the printing elements, measuring a variance of a printing density for that one of the printing elements using the test charts;
    for each of the printing elements, analyzing the measured variance;
    individually selecting a value of the modifiable printing parameter for each of the printing elements based on the analysis; and
    applying the selected value of the modifiable printing parameter for each of the printing elements to the printing device.

2. The method of claim 1, further comprising applying software density compensation to further reduce the variance of the printing density.

3. The method of claim 1, wherein printing the plurality of test charts comprises printing the test charts for a plurality of colors for each of the printing elements.

4. The method of claim 1, wherein printing the plurality of test charts comprises printing the test charts for a plurality of different input density levels for each of the printing elements.

5. The method of claim 1, wherein printing the plurality of test charts comprises printing the test charts at a plurality of different times, separated by at least 15 minutes, for each of the printing elements.

6. The method of claim 1, wherein the analyzing comprises weighting the printing density for either a) an input density level associated with that printing density or b) a time at which the associated test chart was printed.

7. A system for adjusting a modifiable printing parameter of each of a plurality of printing elements of a printing device, the system comprising:
    one or more memory devices that store instructions;
    a parameter adjustment engine stored in the one or more memory devices; and
    one or more processor devices that execute the stored instructions to perform actions for operation of the parameter adjustment engine, the actions comprising:
        for each of the printing elements, measuring a variance of a printing density for that one of the printing elements using a plurality of test charts printed at different values of the modifiable printing parameter;
        for each of the printing elements, analyzing the measured variance;
        individually selecting a value of the modifiable printing parameter for each of the printing elements based on the analysis; and
        applying the selected value of the modifiable printing parameter for each of the printing elements to the printing device.

8. The system of claim 7, wherein the actions further comprise applying software density compensation to further reduce the variance of the printing density.

9. The system of claim 7, wherein the actions further comprise printing the plurality of test charts.

10. The system of claim 9, wherein printing the plurality of test charts comprises printing the test charts for a plurality of colors for each of the printing elements.

11. The system of claim 9, wherein printing the plurality of test charts comprises printing the test charts for a plurality of different input density levels for each of the printing elements.

12. The system of claim 9, wherein printing the plurality of test charts comprises printing the test charts at a plurality of different times, separated by at least 15 minutes, for each of the printing elements.

13. The system of claim 7, wherein the analyzing comprises weighting the printing density for either a) an input density value associated with that printing density or b) a time at which the associated test chart was printed.

14. A non-transitory computer-readable medium having stored thereon instructions for execution by a processor, the instructions comprising:
    for each of the printing elements, measuring a variance of a printing density for that one of the printing elements using a plurality of test charts printed at different values of the modifiable printing parameter;
    for each of the printing elements, analyzing the measured variance;

individually selecting a value of the modifiable printing parameter for each of the printing elements based on the analysis; and applying the selected value of the modifiable printing parameter for each of the printing elements to the printing device.

15. The non-transitory computer-readable medium of claim 14, wherein the instructions further comprise applying software density compensation to further reduce the variance of the printing density.

16. The non-transitory computer-readable medium of claim 14, wherein the instructions further comprise printing the plurality of test charts.

17. The non-transitory computer-readable medium of claim 16, wherein printing the plurality of test charts comprises printing the test charts for a plurality of colors for each of the printing elements.

18. The non-transitory computer-readable medium of claim 16, wherein printing the plurality of test charts comprises printing the test charts for a plurality of different input density levels for each of the printing elements.

19. The non-transitory computer-readable medium of claim 16, wherein printing the plurality of test charts comprises printing the test charts at a plurality of different times, separated by at least 15 minutes, for each of the printing elements.

20. The non-transitory computer-readable medium of claim 14, wherein the analyzing comprises weighting the printing density for either a) an input density value associated with that printing density or b) a time at which the associated test chart was printed.

* * * * *

(12) EX PARTE REEXAMINATION CERTIFICATE (12141st)
United States Patent
Hall et al.

(10) Number: US 11,167,549 C1
(45) Certificate Issued: Sep. 28, 2022

(54) SYSTEMS AND METHODS FOR PRINTER DENSITY COMPENSATION AND STABILITY

(71) Applicant: Global Graphics Software Limited, Cambridge (GB)

(72) Inventors: Daniel Hall, Cambridge (GB); James Fox, Herts (GB)

(73) Assignee: GLOBAL GRAPHICS SOFTWARE LIMITED, Cambridge (GB)

Reexamination Request:
No. 90/014,954, Feb. 9, 2022

Reexamination Certificate for:
Patent No.: 11,167,549
Issued: Nov. 9, 2021
Appl. No.: 16/813,054
Filed: Mar. 9, 2020

(51) Int. Cl.
*B41J 2/045* (2006.01)
(52) U.S. Cl.
CPC ....... *B41J 2/04508* (2013.01); *B41J 2/04586* (2013.01)

(58) Field of Classification Search
None
See application file for complete search history.

(56) References Cited

To view the complete listing of prior art documents cited during the proceeding for Reexamination Control Number 90/014,954, please refer to the USPTO's Patent Electronic System.

*Primary Examiner* — Kenneth Whittington (57) ABSTRACT

A method for adjusting a modifiable printing parameter of each of a plurality of printing elements of a printing device includes printing a plurality of test charts for each of the printing elements at different values of the modifiable printing parameter; measuring a variance of a printing density for each of the test charts; analyzing the measured variances for each of the printing elements; individually selecting a value of the modifiable printing parameter for each of the printing elements based on the analysis; and applying the selected value of the modifiable printing parameter for each of the printing elements to the printing device. Software density compensation can be applied to further reduce the variance of the printing density.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 7 and 14 are determined to be patentable as amended.

Claims 2-6, 8-13 and 15-20, dependent on an amended claim, are determined to be patentable.

1. A method for adjusting a modifiable printing parameter of each of a plurality of printing elements of a printing device, the method comprising:
   printing a plurality of test charts for each of the printing elements at different values of the modifiable printing parameter, *wherein each printing element comprises a plurality of nozzles*;
   for each of the printing elements, measuring a variance of a printing density *between the nozzles* for that one of the printing elements using the test charts;
   for each of the printing elements, analyzing the measured variance;
   individually selecting a *single* value of the modifiable printing parameter for each of the printing elements based on the analysis; and
   applying the selected *single* value of the modifiable printing parameter for each of the printing elements to the printing device.

7. A system for adjusting a modifiable printing parameter of each of a plurality of printing elements of a printing device, *wherein each printing element comprises a plurality of nozzles*, the system comprising:
   one or more memory devices that store instructions;
   a parameter adjustment engine stored in the one or more memory devices; and
   one or more processor devices that execute the stored instructions to perform actions for operation of the parameter adjustment engine, the actions comprising:
   for each of the printing elements, measuring a variance of a printing density *between the nozzles* for that one of the printing elements using a plurality of test charts printed at different values of the modifiable printing parameter;
   for each of the printing elements, analyzing the measured variance;
   individually selecting a *single* value of the modifiable printing parameter for each of the printing elements based on the analysis; and
   applying the selected *single* value of the modifiable printing parameter for each of the printing elements to the printing device.

14. A non-transitory computer-readable medium having stored thereon instructions for execution by a processor *for adjusting a modifiable printing parameter of each of a plurality of printing elements of a printing device, wherein each printing element comprises a plurality of nozzles*, the instructions comprising:
    for each of the printing elements, measuring a variance of a printing density *between the nozzles* for that one of the printing elements using a plurality of test charts printed at different values of the modifiable printing parameter;
    for each of the printing elements, analyzing the measured variance;
    individually selecting a *single* value of the modifiable printing parameter for each of the printing elements based on the analysis; and
    applying the selected *single* value of the modifiable printing parameter for each of the printing elements to the printing device.

\* \* \* \* \*